US012256480B2

(12) United States Patent
Feng et al.

(10) Patent No.: US 12,256,480 B2
(45) Date of Patent: Mar. 18, 2025

(54) DRAWER TYPE MICROWAVE OVEN

(71) Applicants: GUANGDONG GALANZ ENTERPRISES CO., LTD., Guangdong (CN); GUANGDONG GALANZ MICROWAVE ELECTRICAL APPLIANCES MANUFACTURING CO., LTD., Guangdong (CN)

(72) Inventors: Liangwang Feng, Foshan (CN); Feng Li, Foshan (CN)

(73) Assignees: GUANGDONG GALANZ ENTERPRISES CO., LTD., Foshan (CN); GUANGDONG GALANZ MICROWAVE ELEC APPLIANCE MANF CO, Zhongshan (CN)

( * ) Notice: Subject to any disclaimer, the term of this patent is extended or adjusted under 35 U.S.C. 154(b) by 734 days.

(21) Appl. No.: 17/442,293

(22) PCT Filed: Nov. 20, 2020

(86) PCT No.: PCT/CN2020/130655

§ 371 (c)(1),
(2) Date: Sep. 23, 2021

(87) PCT Pub. No.: WO2021/115106

PCT Pub. Date: Jun. 17, 2021

(65) Prior Publication Data

US 2022/0167472 A1 May 26, 2022

(30) Foreign Application Priority Data

Dec. 11, 2019 (CN) ........................ 201911269016.1

(51) Int. Cl.
*H05B 6/64* (2006.01)

(52) U.S. Cl.
CPC ......... *H05B 6/6423* (2013.01); *H05B 6/6414* (2013.01); *H05B 6/6426* (2013.01)

(58) Field of Classification Search
CPC .. H05B 6/6414; H05B 6/6423; H05B 6/6426; H05B 6/642; H05B 6/80
(Continued)

(56) References Cited

U.S. PATENT DOCUMENTS

| | | | | |
|---|---|---|---|---|
| 7,241,978 B2 * | 7/2007 | Iwamoto | H05B 6/6402 219/722 |
| 8,357,886 B2 * | 1/2013 | Yoshidome | H05B 6/80 219/400 |

(Continued)

FOREIGN PATENT DOCUMENTS

| | | |
|---|---|---|
| CN | 203615385 U | 5/2014 |
| CN | 104613512 A | 5/2015 |

(Continued)

OTHER PUBLICATIONS

Translation of CN203615385U, "Drawer-type microwave oven", May 28, 2014, by ProQuest (Year: 2014).*

(Continued)

*Primary Examiner* — Quang T Van
(74) *Attorney, Agent, or Firm* — Taft Stettinius & Hollister LLP

(57) ABSTRACT

The present disclosure relates to a drawer-type microwave oven including a cooker body, a door, a front plate, a first slide rail, a second slide rail, a driving motor and a flow directing assembly. An air inlet end of the flow directing assembly is in communication with an air outlet mesh, and an air outlet end of the flow directing assembly is arranged at the bottom of a first spacing region. When the above drawer-type microwave oven works, the high-temperature water vapor inside the cooking cavity is discharged into the
(Continued)

flow directing assembly through the air outlet mesh, and is directed and discharged to the bottom of the first spacing region by the flow directing assembly, and then flows along a bottom of the cooking cavity, and is discharged to the outside of the cooker body through a front side air outlet hole.

18 Claims, 9 Drawing Sheets

(58) Field of Classification Search
USPC ....... 219/725, 681, 685, 756, 762, 763, 385, 219/391, 392, 394, 399, 403, 478, 757, 219/722; 126/190, 197, 340, 192, 21 R, 126/273 R; 99/443 R, 476, 483
See application file for complete search history.

(56) References Cited

U.S. PATENT DOCUMENTS

| | | | | |
|---|---|---|---|---|
| 2010/0006086 | A1* | 1/2010 | Iwamoto | F24C 15/327 126/21 R |
| 2018/0279823 | A1 | 10/2018 | Cho | |

FOREIGN PATENT DOCUMENTS

| | | | |
|---|---|---|---|
| CN | 104633726 | A | 5/2015 |
| CN | 104633727 | A | 5/2015 |
| CN | 106322454 | A | 1/2017 |
| CN | 206300225 | U | 7/2017 |
| CN | 110848765 | A | 2/2020 |
| CN | 211695025 | U | 10/2020 |
| WO | 2017015780 | A1 | 2/2017 |

OTHER PUBLICATIONS

Translation of CN104613512B, "Microwave oven", May 13, 2015, by ProQuest (Year: 2015).*
International Search Report for corresponding PCT Application No. PCT/CN2020/130655 dated Feb. 8, 2021, 5 pages.
Written Opinion for corresponding PCT Application No. PCT/CN2020/130655 dated Feb. 8, 2021, 5 pages.
Chinese Patent Office, Notice of Allowance issued in corresponding Application No. 201911269016.1, dated Oct. 31, 2024, 4 pp.

* cited by examiner

DRAWER TYPE MICROWAVE OVEN

CROSS REFERENCE TO RELATED APPLICATIONS

This is a U.S. National Stage application of, and claims priority to, PCT/CN2020/130655, filed Nov. 20, 2020, which further claims priority to Chinese Patent Application No. 201911269016.1, filed Dec. 11, 2019, the disclosures of which are incorporated herein by reference in their entirety.

TECHNICAL FIELD

The present disclosure relates to the field of microwave oven technology, particularly to a drawer-type microwave oven.

BACKGROUND

The connection structure between the door and the cooker body of the microwave oven is hinged connection or sliding rail connection, wherein, the hinged manner is used for a rotating door, and the sliding rail connection is used for a drawer-type door, and the complete machine is usually called a drawer-type microwave oven. Wherein, the drawer-type microwave oven uses a slide rail motor to drive the slide rail to move back and forth, thereby achieving automatic open or close of the door. In the heating process of the drawer-type microwave oven, especially the microwave oven with an electrical heated tube, a high-temperature water vapor will be generated after a food is heated, which is generally discharged into the space between a side wall of a cooking cavity and a side wall of a housing of the cooker body through an air outlet mesh opened on the side wall of the cooking cavity, and then discharged to the outside of the cooker body. In addition, the drawer-type microwave oven comprises slide rails located on two sides of the cooking cavity and a driving motor for driving the slide rails. Since the control system needs to precisely control the driving motor and drive the slide rails to move accurately, the slide rails and the driving motor are both disposed in the space between the side wall of the cooking cavity and the side wall of housing of the cooker body. However, after a long-term operation of the drawer-type microwave oven, the slide rails and the driving motor are prone to damage and thus cannot work normally.

SUMMARY

Based on this, it is necessary to overcome the defects of the prior art and provide a drawer-type microwave oven, which allows the slide rails and the driving motor of the drawer-type microwave oven less likely to be damaged, and to achieve long-term normal operation.

The technical solutions of the present disclosure are as follows.

A drawer-type microwave oven, comprising: a cooker body and a door, the cooker body comprising a housing and a cooking cavity provided within the housing, and both of the housing and the cooking cavity being provided with an opening corresponding to the door that is openable to cover the opening, the housing comprising a first side cover plate and a second side cover plate that are arranged oppositely, and a cavity wall of the cooking cavity arranged oppositely to the first side cover plate being provided with an air outlet mesh; a front plate, arranged around the circumference of the opening of the cooking cavity, a bottom of the front plate being provided with a front side air outlet hole penetrating the front plate, a first spacing region being formed between the first side cover plate and the cavity wall of the cooking cavity, the front side air outlet hole being in communication with the first spacing region, and the door being attached to the front plate to seal the opening when the door is closed; a first slide rail, a second slide rail and a driving motor, the first slide rail being arranged between the cooking cavity and the first side cover plate, the second slide rail being arranged between the cooking cavity and the second side cover plate, and the driving motor being arranged in a second spacing region between the second side cover plate and the cavity wall of the cooking cavity and being configured to drive the second slide rail to move; and a flow directing assembly, an air inlet end of the flow directing assembly being in communication with the air outlet mesh, and an air outlet end of the flow directing assembly being arranged at a bottom of the first spacing region.

When the above drawer-type microwave oven works, the high-temperature water vapor inside the cooking cavity is discharged into the flow directing assembly through the air outlet mesh, and is directed and discharged to the bottom of the first spacing region through the flow directing assembly, and then flows along the bottom of the cooking cavity, and discharged to the outside of the cooker body via the front side air outlet hole, which can prevent the high-temperature water vapor from contacting and damaging the first slide rail, and the high-temperature water vapor will not contact the second slide rail and the driving motor, and the erosion effect of the high-temperature water vapor on the slide rails and the driving motor can be greatly reduced. Thus, the slide rails and the driving motor of the drawer-type microwave oven are not prone to damage and can realize normal long-term operation.

In one embodiment, the housing further includes a rear cover plate connected to the first side cover plate and the second side cover plate, respectively, and a third spacing region is formed between the rear cover plate and the rear wall of the cooking cavity. The flow directing assembly includes a first air guide cover, a side spacing plate, and a second air guide cover. The first air guide cover covers the air outlet mesh, the side spacing plate is arranged at a junction of the first spacing region and the third spacing region, and the first spacing region is isolated from the third spacing region by the side spacing plate that is provided with two air guide openings, the second air guide cover covers the two air guide openings of the side spacing plate, and the first air guide cover is in communication with the second air guide cover through one of the air guide openings, and the other air guide opening forms the air outlet end of the flow directing assembly.

In one embodiment, the drawer-type microwave oven further includes a heat dissipating fan, a variable frequency power source and a magnetron. The heat dissipating fan, the variable frequency power source and the magnetron are all provided in the third spacing region, and air from the heat dissipating fan passes through the magnetron and the variable frequency power source. The housing further includes a bottom cover plate arranged at the bottom of the cooking cavity, and the bottom cover plate is connected to the first side cover plate, the rear cover plate, and the second side cover plate, respectively. At least one of the bottom cover plate, the first side cover plate and the rear cover plate is provided with an air inlet mesh that is in communication with the third spacing region, and the rear wall of the cooking cavity is provided with an air intake mesh.

In one embodiment, the housing further includes a top cover plate arranged on a top of the cooking cavity, and the top cover plate is connected to the first side cover plate and the rear cover plate, respectively. A fourth spacing region is formed between a top wall of the cooking cavity and the top cover plate, and the fourth spacing region is in communication with the first spacing region and the third spacing region, respectively.

In one embodiment, a side of the top wall of the cooking cavity away from the door is provided with a lateral surrounding edge attached to the top cover, and two ends of the lateral surrounding edge are arranged at intervals with the first side cover plate and the second side cover plate, respectively.

In one embodiment, the lateral surrounding edge includes a main body surrounding edge and an arc-shaped surrounding edge connected to one end of the main body surrounding edge, the arc-shaped surrounding edge is configured to guide the air to the first spacing region. The top wall of the cooking cavity is further provided with a guide edge, a ventilation interval is provided between the guide edge and the other end of the main body surrounding edge, and the guide edge extends toward a middle part of the cooking cavity.

In one embodiment, the second air guide cover is located on a side of the side spacing plate away from the front plate, the heat dissipating fan and the air inlet mesh are both arranged at an end of the third spacing region that is close to the flow directing assembly.

In one embodiment, the heat dissipating fan includes a first fan for dissipating heat from the variable frequency power source and a second fan for dissipating heat from the magnetron, and the air inlet mesh includes a side air inlet mesh and a bottom air inlet mesh. One of corner parts of the first side cover plate that is close to the rear cover plate and the bottom cover plate is provided with the side air inlet mesh, and one of the corner parts of the bottom cover plate that is close to the first side cover plate and the rear cover plate is provided with the bottom air inlet mesh. A plane of an air inlet of the first fan is slantwise arranged relative to the bottom cover plate, the plane of the air inlet of the first fan faces the side air inlet mesh and the bottom air inlet mesh, and a plane of an air outlet of the first fan is arranged opposite the variable frequency power source, a plane of an air inlet of the second fan faces the bottom air inlet mesh or the side air inlet mesh, and a plane of an air outlet of the second fan is arranged opposite the magnetron.

In one embodiment, one of the corner parts of the rear cover plate that is close to the first side cover plate and the bottom cover plate is provided with a rear air inlet mesh.

In one embodiment, the first fan is arranged above the second fan, and an angle between a first central axis of the first fan and a second central axis of the second fan is A that is less than 90°.

In one embodiment, the second fan is a vortex fan, an upper surface and a lower surface of the vortex fan are both provided with air inlets, the lower surface of the vortex fan is connected to a third air guide cover, and a top plate of the third air guide cover is provided with a first vent that is in communication with the air inlet on the lower surface of the vortex fan, a motor of the vortex fan is arranged within the third air guide cover, the third air guide cover covers a part of a region of the bottom air inlet mesh, and a projection of the first fan on the bottom cover plate along a vertical direction is located at another part of the region of the bottom air inlet mesh.

In one embodiment, a ventilation gap is provided between the first fan and the second fan.

In one embodiment, a shell of the variable frequency power source is provided with a first lateral ventilation flow channel, and the air outlet of the first fan is in communication with one of ports of the first lateral ventilation flow channel, and an outer wall of the other port of the first lateral ventilation flow channel is connected to a vertical spacing plate and a lateral spacing plate that are arranged on a periphery of the magnetron, the vertical spacing plate is provided with a second vent, and the air outlet of the second fan is in communication with the second vent.

In one embodiment, a power connector of the magnetron is arranged adjacent to the lateral spacing plate, the lateral spacing plate is provided with a third vent corresponding to the power connector of the magnetron, and the third vent is located on a side of the lateral spacing plate close to the vertical spacing plate.

In one embodiment, the drawer-type microwave oven further includes a fourth air guide cover, a radiator shell of the magnetron is provided with a second lateral ventilation flow channel, the fourth air guide cover covers the air intake mesh, and air inlets of the second air vent, the second lateral ventilation flow channel, and the fourth air guide cover are in communication in sequence.

In one embodiment, a heat conducting edge is provided at the air inlet of the fourth air guide cover, and the heat conducting edge is attached to the magnetron.

In one embodiment, the drawer-type microwave oven further includes a first spacing plate that is connected to a bottom edge of the front plate or connected to a side edge of the bottom cover plate close to the opening, the first spacing plate is located below the door and forms a front side air outlet port with a bottom end of the door, and a bottom side of the bottom cover plate of the housing is provided with supporting legs protruding downward, and the first spacing plate and the supporting surface on which the supporting legs are placed form a front side air inlet.

In one embodiment, the drawer-type microwave oven further includes a second spacing plate, a fifth spacing region is formed between the cavity wall of the cooking cavity and the bottom cover plate, the second spacing plate is arranged in the fifth spacing region, and a bottom space of the first spacing region is isolated from a bottom space of the second spacing region by the second spacing plate.

REFERENCE NUMERALS

Figure 1:
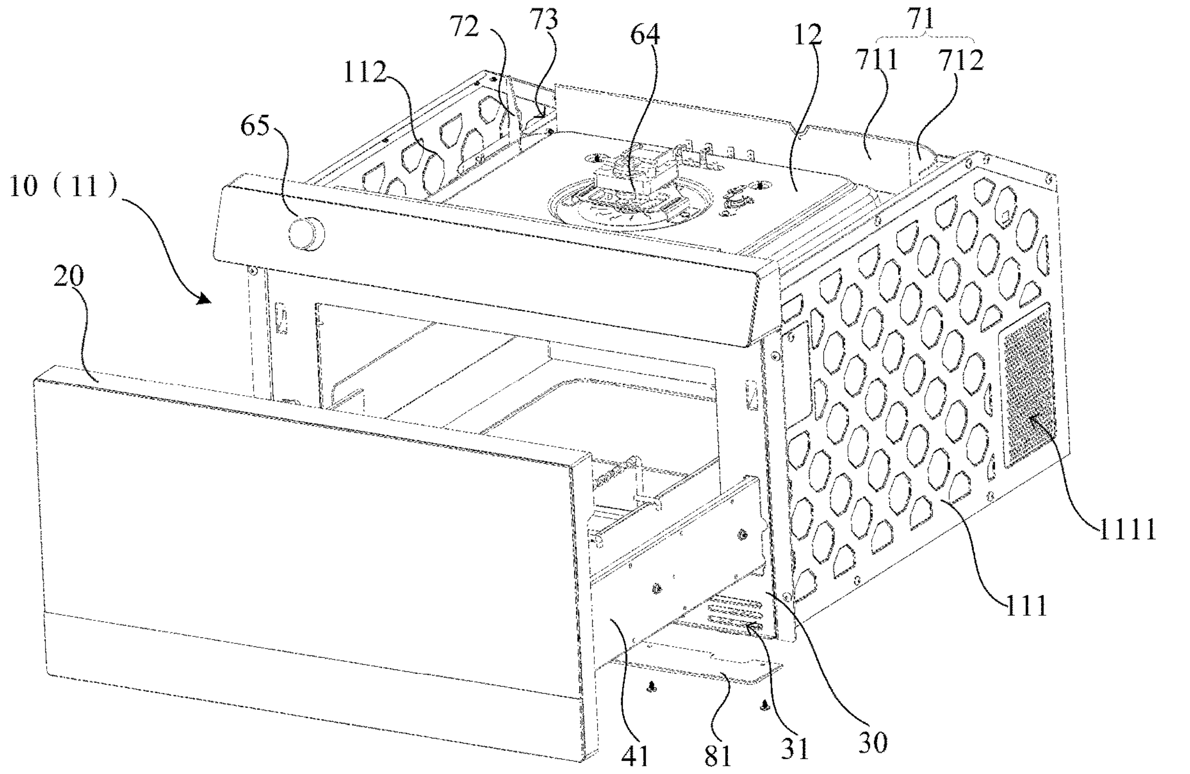
FIG. 1 is a schematic structural view showing a drawer-type microwave oven with a door pulled open and a top cover plate opened according to an embodiment of the present disclosure.
Figure 2:
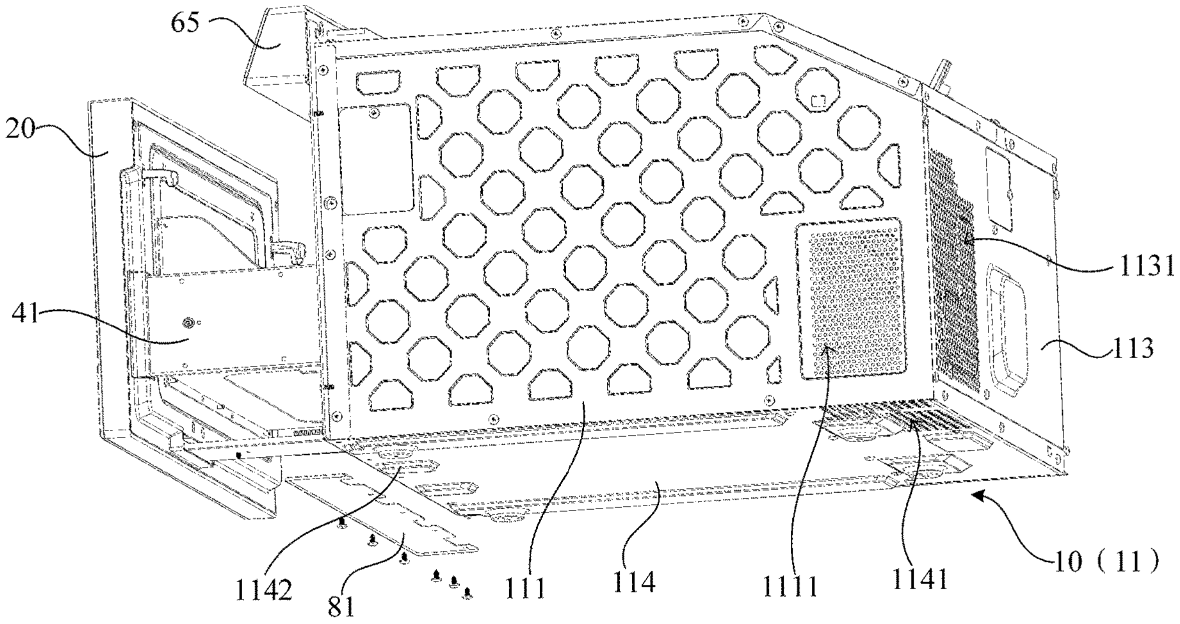
FIG. 2 is another schematic structural view showing a drawer-type microwave oven with a door pulled open and a top cover plate opened according to an embodiment of the present disclosure.

10. cooker body; 11. housing; 111. first side cover plate; 1111. side air inlet mesh; 112. second side cover plate; 113. rear cover plate; 1131. rear air inlet mesh; 114. bottom cover plate; 1141. bottom air inlet mesh; 1142. supporting leg; 115. top cover plate; 12. cooking cavity; 121. air outlet mesh; 122. air intake mesh; 20. door; 30. front plate; 31. front side air outlet hole; 41. first slide rail; 42. second slide rail; 43. driving motor; 50. flow directing assembly; 51. first air guide cover; 52. side spacing plate; 521. air guide opening; 53. second air guide cover; 611. first fan; 6111. first v central axis; 612. second fan; 6121. fan motor; 6122. second central axis; 613. ventilation gap; 62. variable frequency power source; 621. shell; 63. magnetron; 631. power connector; 632. radiator shell; 64. hot air assembly; 641. heating tube; 642. heat stirring fan; 643. hot air motor; 65. control box; 66. third air guide cover; 661. baffle; 662. mounting plate; 71. lateral surrounding edge; 711. main body surrounding edge; 712. arc-shaped surrounding edge; 72. guide edge; 73. ventilation interval; 74. vertical spacing plate; 741. second vent; 75. lateral spacing plate; 751. third vent; 76. fourth air guide cover; 761. heat conducting edge; 81. first spacing plate; 82. second spacing plate; 83. front side air outlet port.

DETAILED DESCRIPTION OF THE EMBODIMENTS

The above objects, features, and advantages of the present disclosure will become more apparent by describing in detail embodiments thereof with reference to the accompanying drawings. In the following description, numerous specific details are set forth in order to provide a thorough understanding of the present disclosure. However, the present disclosure can be implemented in many other ways than those described herein, and similar modifications may be made by those skilled in the art without departing from the scope of the disclosure. Therefore, the present disclosure is not limited to the specific embodiments disclosed below.

In the description of the present disclosure, it should be understood that the terms "first" and "second" are merely used for descriptive purposes, and cannot be understood to indicate or imply relative importance or implicitly indicate the number of technical features indicated. Therefore, the features defined by "first" and "second" may explicitly or implicitly include at least one of the features. In the description of the present disclosure, "plurality" means at least two, such as two, three, etc., unless specifically defined otherwise.

In the description of the present disclosure, it should be understood that, when an element is considered to be "connected to" another element, it can be directly connected to another element or indirectly connected to another element with an intermediate element. Instead, when an element is referred to as being "directly" connected to another element, there is no intermediate element.

Generally, when the high-temperature water vapor is generally discharged into the space between the side wall of the cooking cavity and the side wall of the housing of the cooker body through the air outlet mesh opened on the side wall of the cooking cavity, the high-temperature water vapor will corrode the slide rails and the driving motor, resulting in that the slide rails and the driving motor are damaged and cannot work normally after the drawer-type microwave oven is used for a long time.

In one embodiment, referring to FIG. 1 and FIGS. 4 to 8, the drawer-type microwave oven may comprise a cooker body 10, a door 20, a front plate 30, a first slide rail 41, a second slide rail 42, a driving motor 43 and a flow directing assembly 50.

The cooker body 10 includes a housing 11 and a cooking cavity 12 provided within the housing 11. Both of the housing 11 and the cooking cavity 12 are provided with an opening corresponding to the door 20 that is openable to cover the opening. The housing 11 includes a first side cover plate 111 and a second side cover plate 112 that are arranged oppositely. A cavity wall of the cooking cavity 12 that is arranged oppositely to the first side cover plate 111 is provided with an air outlet mesh 121.

The front plate 30 is arranged around the circumference of the opening of the cooking cavity 12, a bottom of the front plate 30 is provided with a front side air outlet hole 31 penetrating the front plate 30. A first spacing region is formed between the first side cover plate 111 and the cavity wall of the cooking cavity 12, the front side air outlet hole 31 is in communication with the first spacing region, and the door 20 is attached to the front plate 30 to seal the opening when the door 20 is closed.

The first slide rail 41 is arranged between the cooking cavity 12 and the first side cover plate 111, the second slide rail 42 is arranged between the cooking cavity 12 and the second side cover plate 112, and the driving motor 43 is arranged in a second spacing region between the second side cover plate 112 and the cavity wall of the cooking cavity 12 and is configured to drive the second slide rail 42 to move.

An air inlet end of the flow directing assembly 50 is in communication with the air outlet mesh 121, and an air outlet end of the flow directing assembly 50 is arranged at a bottom of the first spacing region.

When the above drawer-type microwave oven works, the high-temperature water vapor inside the cooking cavity 12 is discharged into the flow directing assembly 50 through the air outlet mesh 121, and is directed and discharged to the bottom of the first spacing region through the flow directing assembly 50, and then flows along the bottom of the cooking cavity 12, and discharged to the outside of the cooker body 10 via the front side air outlet hole 31, which can prevent the high-temperature water vapor from contacting and damaging the first slide rail 41, and the high-temperature water vapor will not contact the second slide rail 42 and the driving motor 43, and the erosion effect of the high-temperature water vapor on the slide rails and the driving motor 43 can be greatly reduced. Thus, the slide rails and the driving motor 43 of the drawer-type microwave oven are not prone to damage and can realize normal long-term operation.

Further, referring to FIGS. 1 to 4, the housing 11 further includes a rear cover plate 113 connected to the first side cover plate 111 and the second side cover plate 112, respectively. A third spacing region is formed between the rear cover plate 113 and a rear wall of the cooking cavity 12. The flow directing assembly 50 includes a first air guide cover 51, a side spacing plate 52 and a second air guide cover 53. The first air guide cover 51 covers the air outlet mesh 121, the side spacing plate 52 is arranged at a junction of the first spacing region and the third spacing region, and the first spacing region is isolated from the third spacing region by the side spacing plate 52 provided with two air guide openings 521, the second air guide cover 53 covers the two air guide openings 521 of the side spacing plate 52, and the first air guide cover 51 is in communication with the second air guide cover 53 through one of the air guide openings 521, and the other air guide opening 521 forms the air outlet end of the flow directing assembly 50. In this way, on the one hand, the high-temperature water vapor discharged from the air outlet mesh 121 is directed and discharged to the bottom of the first spacing region through the flow directing assembly 50. On the other hand, since the first spacing region is isolated from the third spacing region by the side spacing plate 52, the side spacing plate 52 can prevent high-temperature water vapor from entering into the third spacing region to affect the normal operation of electronic components (for example, the variable frequency power source 62 and the magnetron 63). In addition, during the high-temperature water vapor passes through the flow directing assembly 50, since the side spacing plate 52 is arranged at the junction of the first spacing region and the third spacing region, the cold air outside entering into the third spacing region contacts the flow directing assembly 50 to play a rapid air cooling effect on the high-temperature water vapor of the flow directing assembly 50, thereby reducing the temperature of the high-temperature water vapor, and reducing the erosion effect of the high-temperature water vapor discharged from the air outlet end of the flow directing assembly 50 on the first slide rail 41.

It can be understood that the expression "the first spacing region is isolated from the third spacing region by the side spacing plate 52" means that two opposite side edges of the spacing plate 52 are attached to the cavity wall of the cooking cavity 12 and the first side cover plate 111, respectively, the bottom edge of the side spacing plate 52 is attached to the bottom cover plate 114, and the top edge of the side spacing plate 52 extends vertically upward to the top cover plate 115.

Further, referring to FIGS. 4, 7, 9 and 10, the drawer-type microwave oven further includes a heat dissipating fan, a variable frequency power source 62 and a magnetron 63. The heat dissipating fan, the variable frequency power source 62 and the magnetron 63 are all disposed in the third spacing region, the air from the heat dissipating fan passes through the magnetron 63 and the variable frequency power source 62. The housing 11 further includes a bottom cover plate 114 disposed at the bottom of the cooking cavity 12, the bottom cover plate 114 is connected to the first side cover plate 111, the rear cover plate 113, and the second side cover plate 112, respectively. At least one of the bottom cover plate 114, the first side cover plate 111 and the rear cover plate 113 is provided with an air inlet mesh that is in communication with the third spacing region. The rear wall of the cooking cavity 12 is provided with an air intake mesh 122. In this way, the cold air outside enters the third spacing region through the air inlet mesh under the action of the heat dissipating fan, to air-cool the variable frequency power source 62 and the magnetron 63. Part of the air enters the inside of the cooking cavity 12 through the air intake mesh 122, and is discharged outward from the air outlet mesh 121. The other part of the air flows toward the second spacing region and the fourth spacing region between the top wall of the cooking cavity 12 and the top cover plate 115, and is finally discharged outward through the first spacing region and the front side air outlet hole 31 in sequence.

Further, referring to FIGS. 4, 7, 9 and 10, the housing 11 further includes a top cover plate 115 disposed on a top of the cooking cavity 12. The top cover plate 115 is connected to the first side cover plate 111 and the rear cover plate 113, respectively. A fourth spacing region is formed between the top wall of the cooking cavity 12 and the top cover plate 115, and the fourth spacing region is in communication with the first spacing region and the third spacing region, respectively. In this way, the air within the third spacing region flows to the fourth spacing region, then flows toward the first spacing region through the fourth spacing region and flows to the bottom of the first spacing region, and is finally discharged outward through the first spacing region and the front side air outlet hole 31. While the air within the fourth spacing region flows to the bottom of the first spacing region, the water vapor discharged outward from the air outlet end of the flow directing assembly 50 can be suppressed, so that the water vapor does not flow upward to contact the first slide rail 41, thus, the erosion effect on the first slide rail 41 can be further reduced.

Further, referring to FIGS. 4, 7, 9 and 10, the top wall of the cooking cavity 12 is provided with a hot air assembly 64. The hot air assembly 64 includes a heating tube 641, a hot stirring fan 642 with metal fan blades, and a hot air motor 643 driving the hot stirring fan 642. When the air within the third spacing region flows into the fourth spacing region, it can dissipate the heat from the hot air motor 643, preventing heat from accumulating on the top of the cooker body 10 to affect the control box 65 located on the side of the hot air assembly 64. In addition, the control box 65 is provided on the top cover plate 115. The control cooker body 65 is, for example, arranged on a side of the top cover plate 115 close to the door 20, so as to operate the control box 65. Definitely, the control box 65 may also be arranged at other positions on the top cover plate 115.

Further, referring to FIGS. 4, 7, 9 and 10, a side of the top wall of the cooking cavity 12 away from the door 20 is provided with a lateral surrounding edge 71, the lateral surrounding edge 71 is attached to the top cover plate 115, and two ends of the lateral surrounding edge 71 are arranged at intervals with the first side cover plate 111 and the second side cover plate 112, respectively. In this way, the lateral surrounding edge 71 separates the hot air assembly 64 from the variable frequency power source 62 and the magnetron 63, which can prevent the heat generated by the hot air assembly 64 from hurtling to the variable frequency power source 62 and the magnetron 63 behind the lateral surrounding edge 71 to affect the normal operation of the variable frequency power source 62 and the magnetron 63.

Further, referring to FIGS. 4, 7, 9 and 10, the lateral surrounding edge 71 includes a main body surrounding edge 711 and an arc-shaped surrounding edge 712 connected to one end of the main body surrounding edge 711. The arc-shaped surrounding edge 712 is configured to guide air to the first spacing region. The top wall of the cooking cavity 12 is further provided with a guide edge 72, a ventilation interval 73 is provided between the guide edge 72 and the other end of the main body surrounding edge 711, and the guide edge 72 extends toward the middle part of the cooking cavity 12. In this way, one part of the air discharged from the heat dissipating fan flows along the lateral surrounding edge 71 and enters into the first spacing region, and then is discharged outward from the front side air outlet hole 31 of the front plate 30. The other part of the air discharged from the heat dissipating fan enters the top of the cooking cavity 12 through the ventilation interval 73, then flows through the hot air assembly 64 and enters into the first spacing region, and then is also discharged outward from the front side air outlet hole 31 of the front plate 30.

Further, referring to FIGS. 4 to 7, 9 and 10, the second air guide cover 53 is located on a side of the side spacing plate 52 away from the front plate 30, the heat dissipating fan and the air inlet mesh are both arranged at the end of the third spacing region that is close to the flow directing assembly 50. In this way, the cold air outside entering from the end of the third spacing region that is close to the flow directing assembly 50 will contact the flow directing assembly 50, thus, a better cooling effect on the high-temperature water vapor in the flow directing assembly 50 can be achieved, which is beneficial for making the temperature of the gas finally discharged from the front side air outlet hole 31 to be lower, so that the operator will not feel discomfort due to the higher temperature of the discharged gas.

Further, referring to FIGS. 4 to 7, 9 and 10, the heat dissipating fan includes a first fan 611 for dissipating heat from the variable frequency power source 62 and a second fan 612 for dissipating heat from the magnetron 63. The air inlet mesh includes a side air inlet mesh 1111 and a bottom air inlet mesh 1141. one of corner parts of the first side cover plate 111 that is close to the rear cover plate 113 and the bottom cover plate 114 is provided with the side air inlet mesh 1111, one of the corner parts of the bottom cover plate 114 that is close to the first side cover plate 111 and the rear cover plate 113 is provided with the bottom air inlet mesh 1141. The plane of the air inlet of the first fan 611 is slantwise arranged relative to the bottom cover plate 114, the plane of the air inlet of the first fan 611 faces the side air inlet mesh 1111 and the bottom air inlet mesh 1141, and the plane of the air outlet of the first fan 611 is arranged opposite the variable frequency power source 62, the plane of the air inlet of the second fan 612 faces the bottom air inlet mesh 1141 or the side air inlet mesh 1111, and the plane of the air outlet of the second fan 612 is arranged opposite the magnetron 63. In this way, on the one hand, the first fan 611 draws in the air outside the cooker body 10 through the side air inlet mesh 1111 and the bottom air inlet mesh 1141, and blows it to the variable frequency power source 62 to dissipate the heat from the variable frequency power source 62. The air intake quantity is large, which has a good heat dissipation effect on the variable frequency power source 62. The second fan 612 draws in the air outside the cooker body 10 through the bottom air inlet mesh 1141 or the side air inlet mesh 1111, and blows it to the magnetron 63 for heat dissipation, to achieve a good heat dissipation effect on the magnetron 63. On the other hand, since the plane of the air inlet of the first fan 611 is slantwise arranged relative to the bottom cover plate 114, compared with the horizontal arrangement, the horizontal space occupied by the first fan 611 can be reduced to a certain extent, such that the capacity of the cooking cavity 12 can be increased while the heat dissipation effect can be improved.

Further, referring to FIGS. 3 to 7, 9 and 10, one of the corner parts of the rear cover plate 113 that is close to the first side cover plate 111 and the bottom cover plate 114 is provided with a rear air inlet mesh 1131. In this way, when the first fan 611 and the second fan 612 works, the air outside of the cooker body 10 can also enter into the cooker body 10 through the rear air inlet mesh 1131, to increase the air intake quantity and ensure a better heat dissipation effect.

Further, referring to FIGS. 3 to 7, 9 and 10, the first fan 611 is arranged above the second fan 612, and an angle between a first central axis 6111 of the first fan 611 and a second central axis 6122 of the second fan 612 is A, and A is less than 90°. It should be explained that the first central axis 6111 of the first fan 611 refers to an axis perpendicular to the plane of the air inlet of the first fan 611, and the second central axis 6122 of the second fan 612 refers to an axis perpendicular to the plane of the air inlet of the first fan 612. Specifically, the angle A between the first central axis 6111 of the first fan 611 and the second central axis 6122 of the second fan 612 is in the range of 30°~40°, preferably, A is 36°.

Further, referring to FIGS. 3 to 7, 9 and 10, the second fan 612 is a vortex fan, an upper surface and a lower surface of the vortex fan are both provided with air inlets, the lower surface of the vortex fan is connected to a third air guide cover 66, and a top plate of the third air guide cover 66 is provided with a first vent that is in communication with the air inlet of the lower surface of the vortex fan. A motor of the vortex fan is arranged in the third air guide cover 66, the third air guide cover 66 covers a part of a region of the bottom air inlet mesh 1141, and a projection of the first fan 611 on the bottom cover plate 114 along a vertical direction is located at another part of the region of the bottom air inlet mesh 1141. In this way, the third air guide cover 66 can realize to divide the air entering into the housing 11 from the bottom air inlet mesh 1141 into two independently isolated air, one of which is sucked in by the air inlet of the first fan 611, and the other is sucked in by the air inlet of the second fan 612, and the two air flows will not be chaotic and partially offset, thus improving the utilization of cold air and ensuring the heat dissipation effect. In addition, the fan motor 6121 of the vortex fan is arranged within the third air guide cover 66, the air flow entering into the third air guide cover 66 has a heat dissipation effect on the fan motor 6121, which increasing the service life of the fan motor 6121.

Specifically, referring to FIGS. 3 to 7, 9 and 10, the third air guide cover 66 includes two baffles 661 arranged at intervals and a mounting plate 662 connecting the two baffles 661. The first vent is opened and formed on the mounting plate 662. The baffles 661 are connected to the rear wall of the cooking cavity 12 and the rear cover plate 113, respectively. The fan motor 6121 of the second fan 612 is arranged between the two baffles 661. The region between the two baffles 661 is opposite to the rear air inlet mesh 1131 of the rear cover plate 113, and the air outside may enter between the two baffles 661 through the rear air inlet mesh 1131. In addition, the mounting plate 662 is opposite to the bottom air inlet mesh 1141 of the bottom cover plate 114, and the air outside may also enter into the third air guide cover 66 through the bottom air inlet mesh 1141.

Further, referring to FIGS. 3 to 7, 9 and 10, a ventilation gap 613 is provided between the first fan 611 and the second fan 612. In this way, a part of the air enters into the third air guide cover 66 through the bottom air inlet mesh 1141 and then enters the air inlet on the lower surface of the second fan 612, and the other part of the air enters into the housing 11 through the bottom air inlet mesh 1141 and the side air inlet mesh 1111, and enters the air inlet on the upper surface of the second fan 612 from the ventilation gap 613 between the first fan 611 and the second fan 612, thereby increasing the cold air intake quantity from the second fan 612 and having a better heat dissipation effect.

Further, referring to FIGS. 3 to 7, 9 and 10, a shell 621 of the variable frequency power source 62 is provided with a first lateral ventilation flow channel, and the air outlet of the first fan 611 is in communication with one of the ports of the first lateral ventilation flow channel, and the outer wall of the other port of the first lateral ventilation flow channel is connected to a vertical spacing plate 74 and a lateral spacing plate 75. The vertical spacing plate 74 and the lateral spacing plate 75 are arranged on the periphery of the magnetron 63, the vertical spacing plate 74 is provided with a second vent 741, and the air outlet of the second fan 612 is in communication with the second vent 741. In this way, on the one hand, the cold air sent from the air outlet of the first fan 611 enters into the first lateral ventilation flow channel to achieve better heat dissipation for the variable frequency power source 62. On the other hand, under the function of the vertical spacing plate 74 and the vertical spacing plate 75, the two air flows will not be chaotic and partially offset, thus improving the utilization of cold air and ensuring the heat dissipation effect.

Further, the lateral spacing plate 75 is also connected to the rear wall of the cooking cavity 12 and the rear cover plate 113, respectively. Likewise, the vertical spacing plate 74 is also connected to the rear wall of the cooking cavity 12 and the rear cover plate 113, respectively.

Further, a power connector 631 of the magnetron 63 is arranged adjacent to the lateral spacing plate 75. The lateral spacing plate is provided with a third vent 751 corresponding to the power connector of the magnetron 63. The third vent 751 is located on the side of the lateral spacing plate 75 close to the vertical spacing plate 74. In this way, after the cold air from the first fan 611 flows out through the first lateral ventilation flow channel, part of the air flows into the space region where the magnetron 63 is located through the third vent 751, and when it flows into the region where the magnetron 63 is located from top to bottom, it fully contacts with the magnetron 63 for heat exchange, which can lower the temperature of the magnetron 63 well. In addition, the generation of the whirling air in the region where the magnetron 63 is located can be avoided.

Further, the drawer-type microwave oven further includes a fourth air guide cover 76, a radiator shell 632 of the magnetron 63 is provided with a second lateral ventilation flow channel, the fourth air guide cover 76 covers the air intake mesh 122, and air inlets of the second air vent 741, the second lateral ventilation flow channel, and the fourth air guide cover 76 are in communication in sequence. In this way, the cold air from the second fan 612 passes through the second air vent 741 and the second lateral ventilation flow channel, and enters into the fourth air guide cover 76, and then enters into the cooking cavity 12 through the air intake mesh 122.

Further, referring to FIGS. 3 to 7, 9 and 10, a heat conducting edge 761 is provided at the air inlet of the fourth air guide cover 76, and the heat conducting edge 761 is attached to the magnetron 63. Specifically, the heat conducting edge 761 is attached to the radiator shell 632 of the magnetron 63, to conduct the heat from the radiator shell 632 of the magnetron 63 to the fourth air guide cover 76 by the principle of heat conduction, to improve the heat dissipation effect for the magnetron 63.

In a specific embodiment, referring to FIGS. 3 to 7, 9 and 10, the power connector 631 of the magnetron 63 is arranged adjacent to the lateral spacing plate 75, the lateral spacing plate 75 is provided with a third vent 751 corresponding to the power connector of the magnetron 63, and the third vent 751 is located on a side of the lateral spacing plate 75 close to the vertical spacing plate 74. The drawer-type microwave oven further includes a fourth air guide cover 76, the radiator shell 632 of the magnetron 63 is provided with a second lateral ventilation flow channel, the rear wall of the cooking cavity 12 is provided with an air intake mesh 122, the fourth air guide cover 76 covers the air intake mesh 122, and air inlets of the second air vent 741, the second lateral ventilation flow channel, and the fourth air guide cover 76 are in communication in sequence. In this way, when there is only the air blown by the second fan 612 in the fourth air guide cover 76, whirling air is easily generated in the fourth air guide cover 76. However, after the third vent 751 is provided on the lateral spacing plate 75, the air blown by the first fan 611 can enter into the region where the magnetron 63 is located from top to bottom through the third vent 751, and then enters into the fourth air guide cover 76, which is beneficial to avoid the generation of the whirling air while having a better heat dissipation effect on the magnetron 63.

The drawer-type microwave oven further includes a container connected to the door 20 for placing cooking materials.

Figure 4:
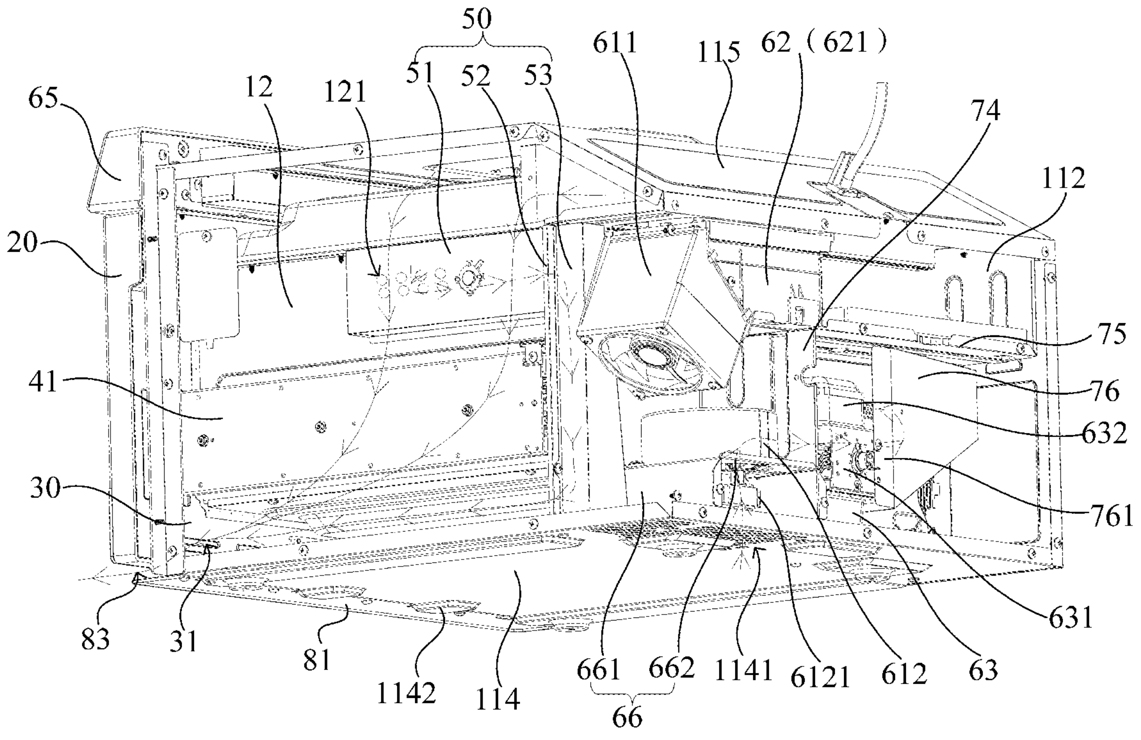
FIG. 4 is a schematic structural view showing a drawer-type microwave oven with a first side cover plate and a rear cover plate opened according to an embodiment of the present disclosure.
Figure 5:
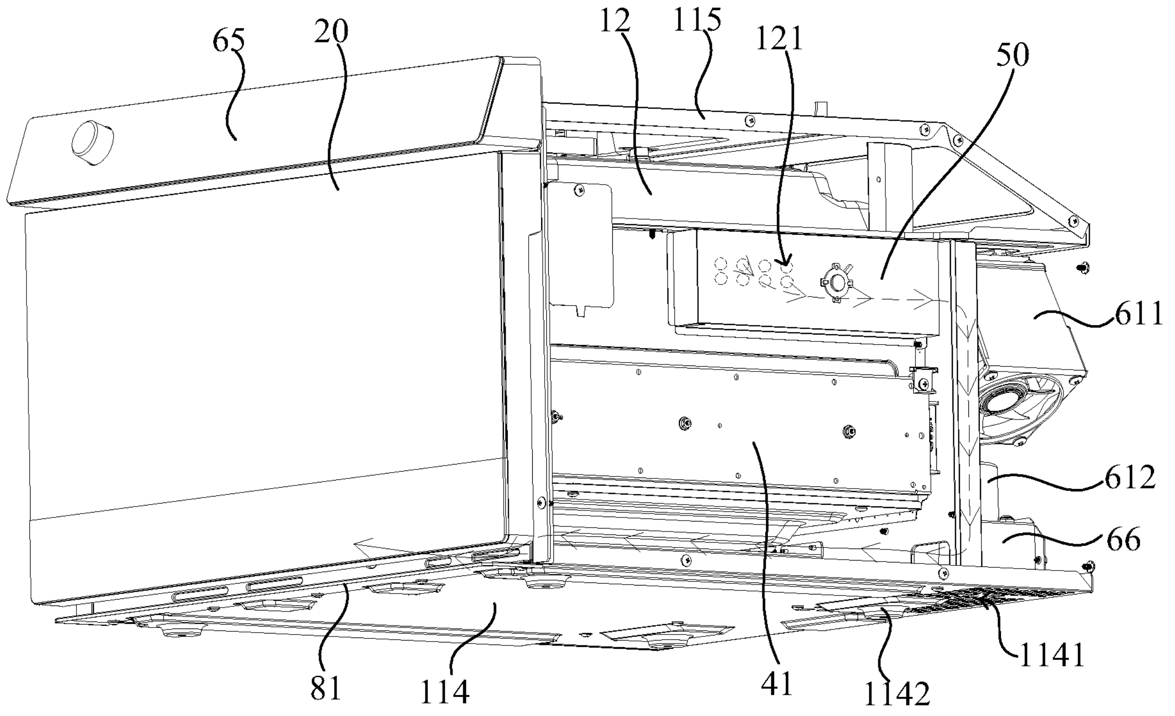
FIG. 5 is another schematic structural view showing a drawer-type microwave oven with a first side cover plate and a rear cover plate opened according to an embodiment of the present disclosure.
Figure 6:
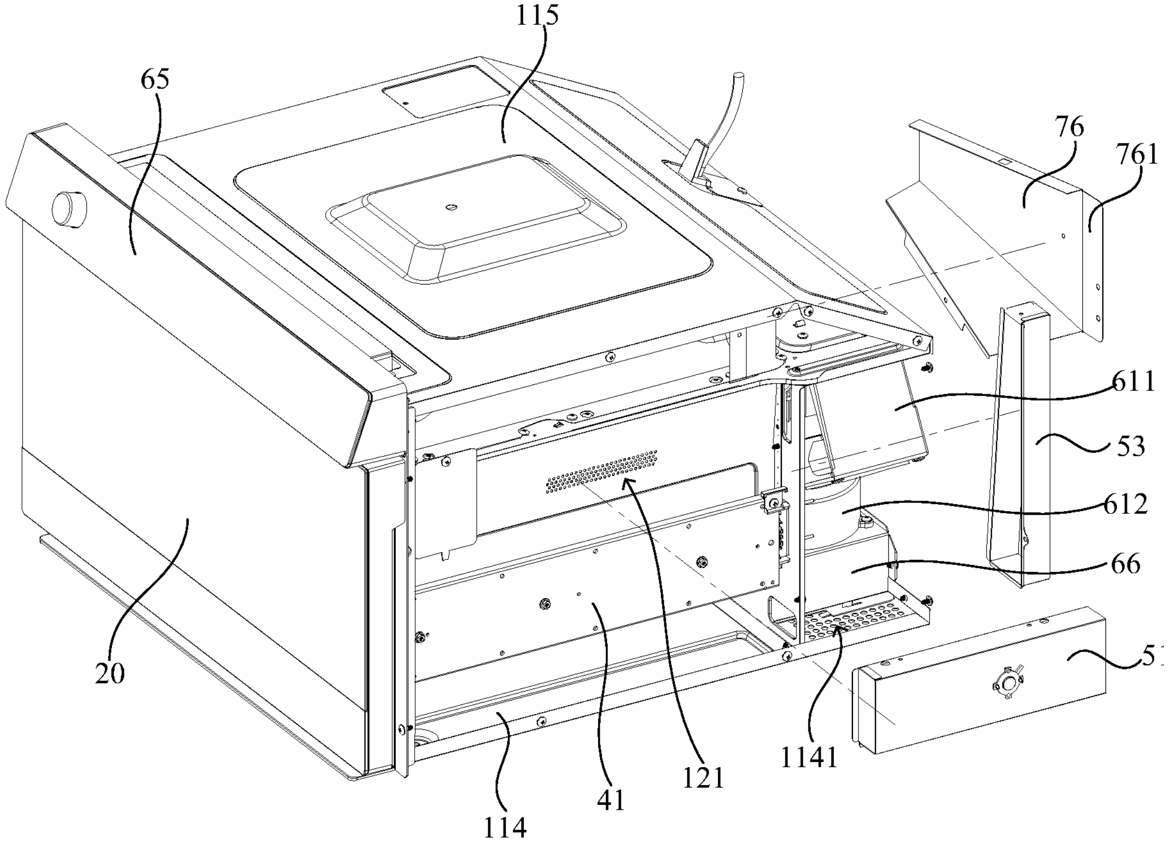
FIG. 6 is a schematic exploded structural view showing a drawer-type microwave oven according to an embodiment of the present disclosure.
Figure 7:
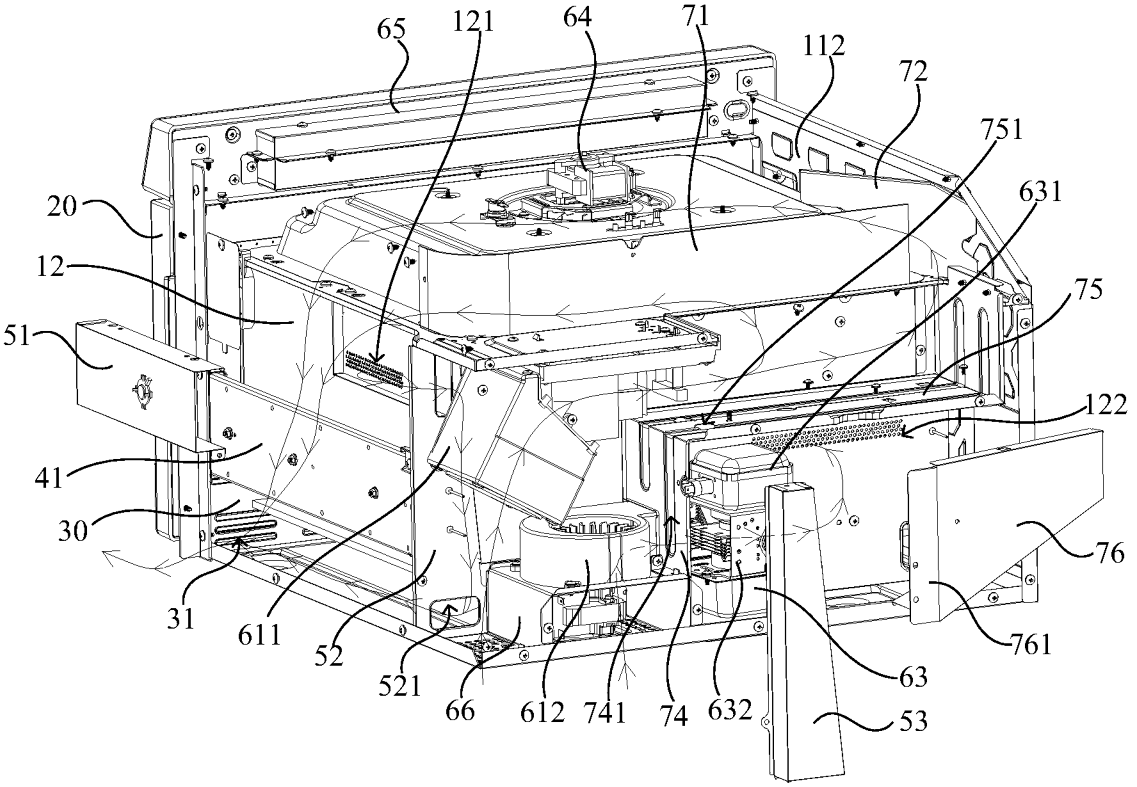
FIG. 7 is a schematic structural view showing a drawer-type microwave oven with a first side cover plate and a rear cover plate opened and a flow directing assembly and a fourth air guide cover exploded, according to an embodiment of the present disclosure.
Figure 8:
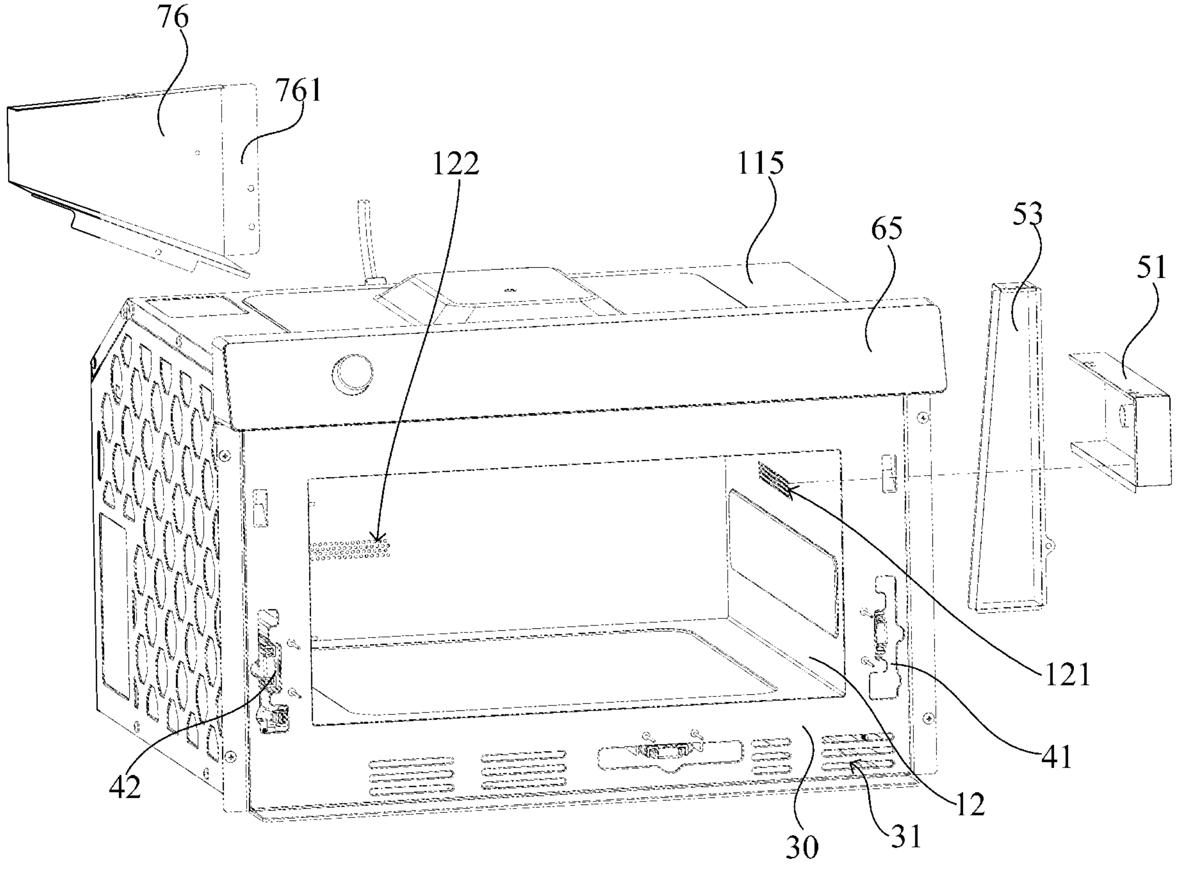
FIG. 8 is a schematic structural view showing a drawer-type microwave oven with a door removed and a flow directing assembly and a fourth air guide cover exploded, according to an embodiment of the present disclosure.
Figure 9:
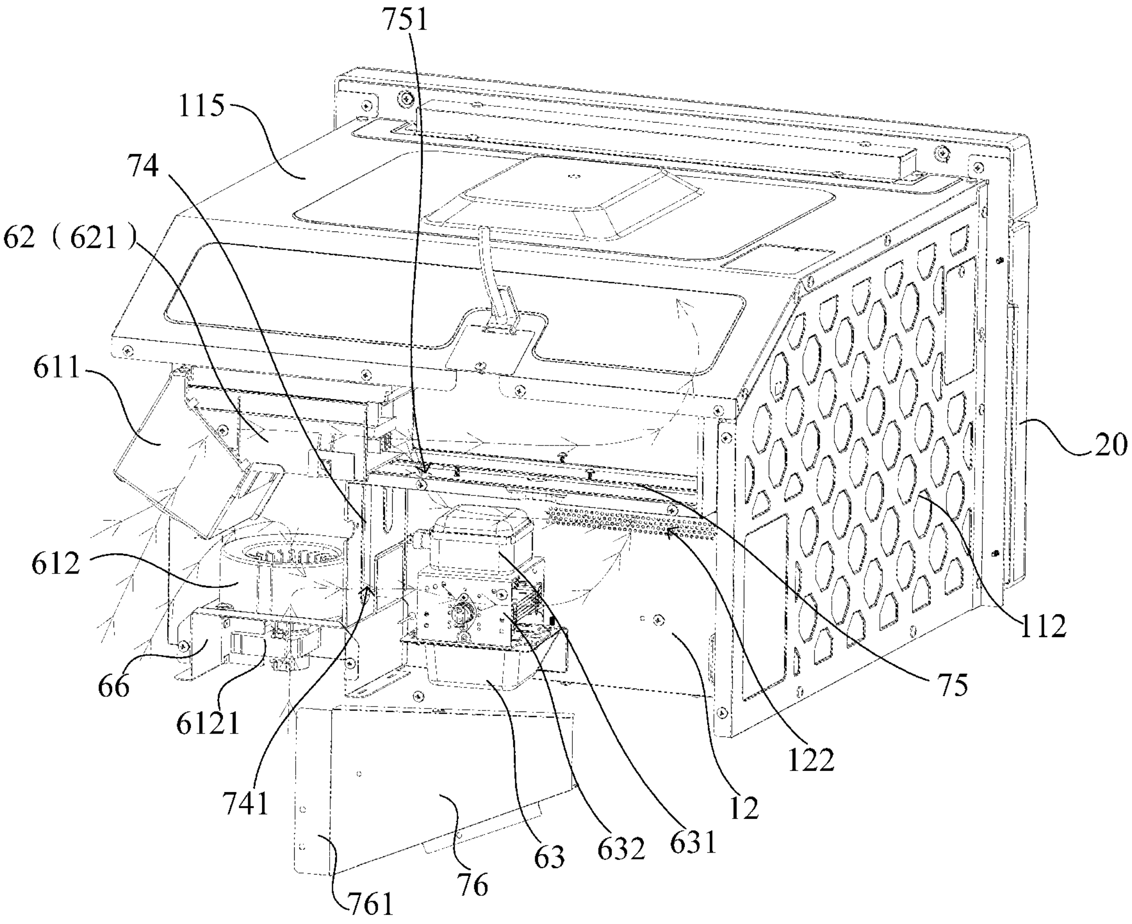
FIG. 9 is a schematic structural view showing a drawer-type microwave oven with a first side cover plate and a rear cover plate opened and a fourth air guide cover exploded, according to an embodiment of the present disclosure.
Figure 10:
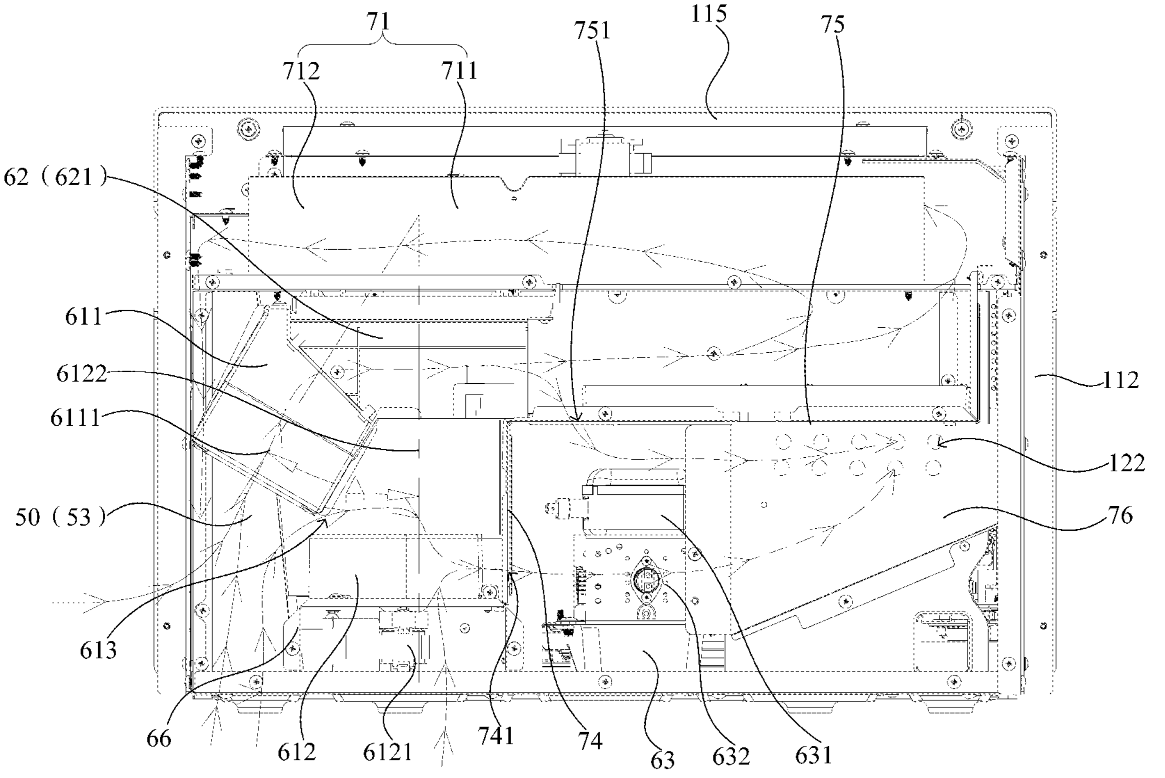
FIG. 10 is a schematic view showing the internal structure of a drawer-type microwave oven with a rear cover plate opened according to an embodiment of the present disclosure.

Further, referring to FIG. 4, the drawer-type microwave oven further includes a first spacing plate 81. The first spacing plate 81 is connected to a bottom edge of the front plate 30 or connected to a side edge of the bottom cover plate 114 close to the opening, the first spacing plate 81 is located below the door 20 and forms a front side air outlet port 83 with the bottom end of the door 20, and the bottom side of the bottom cover plate 114 is provided with supporting legs 1142 protruding downward, the first spacing plate 81 and the supporting surface (such as a bottom wall of a cabinet) on which the supporting legs 1142 are placed form a front side air inlet. In this way, the first spacing plate 81 can avoid mixing-flow of the cold air entering from the front side air inlet with the hot air discharged from the front side air outlet port 83, and prevent the hot air discharged from the front side air outlet port 83 from directly entering the front side air inlet and then entering into the cooker body 10, which has a better buffering effect, i.e., after the hot air is discharged from the front side air outlet port 83, it changes heat with the air outside, and then enters into the cooker body 10 through the front side air inlet. In addition, the hot air discharged from the front side air outlet port 83 can be reflected toward the upper front side of the cooker body 10 by the first spacing plate 81, so that the hot air is not easy to be sucked in from the front side air inlet.

Figure 3:
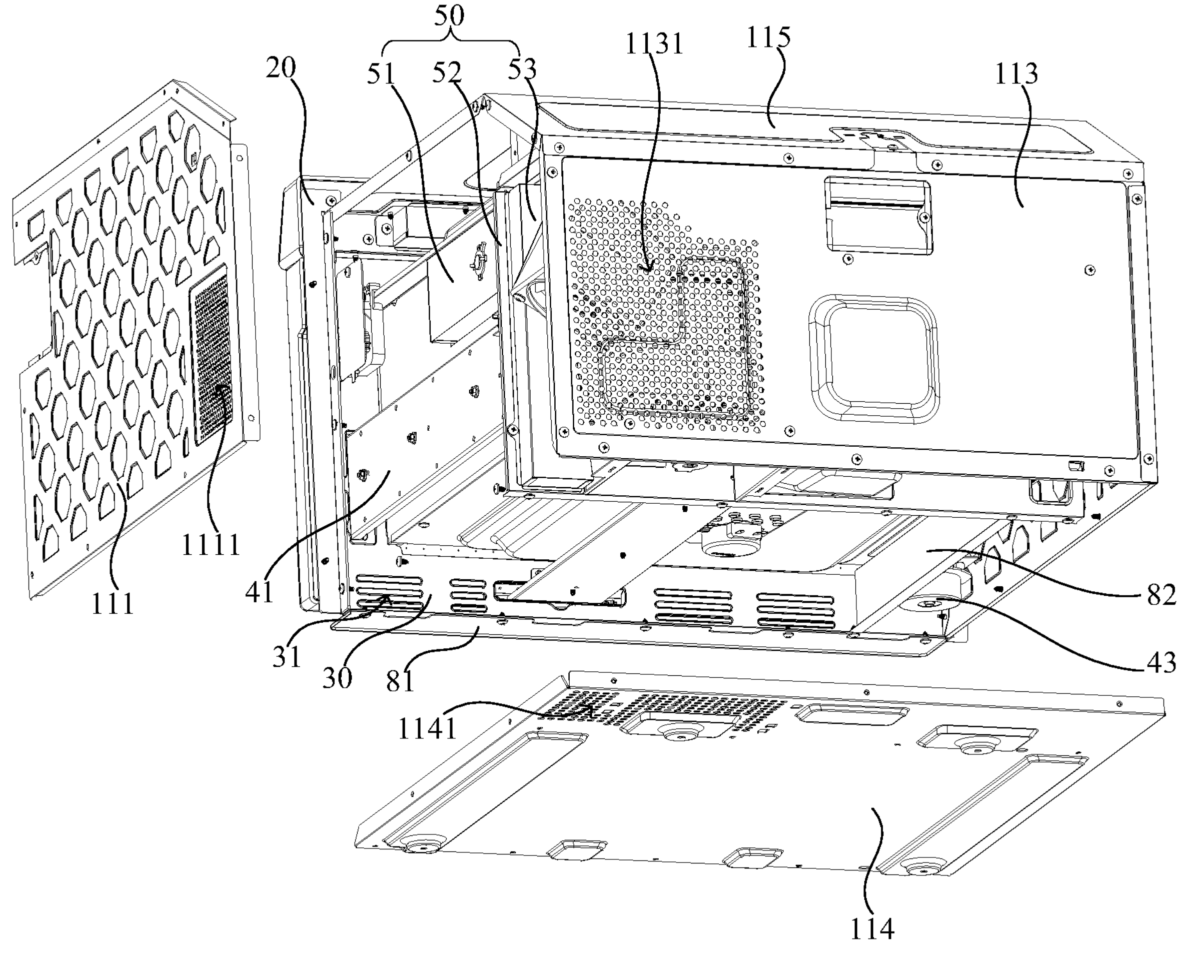
FIG. 3 is a schematic exploded structural view showing a drawer-type microwave oven according to an embodiment of the present disclosure.

Further, referring to FIG. 3 and FIG. 4, the drawer-type microwave oven further includes a second spacing plate 82. A fifth spacing region is formed between the cavity wall of the cooking cavity 12 and the bottom cover plate 114, and the second spacing plate 82 is arranged within the fifth spacing region, a bottom space of the first spacing region is isolated from a bottom space of the second spacing region by the second spacing plate 82. In this way, the fifth spacing region can be divided into two left and right spaces by the second spacing plate 82, which can prevent the high-temperature water vapor discharged outward from the air outlet mesh 121 from entering into the second spacing region, thereby preventing the high-temperature water vapor from eroding the second slide rail 42 and the driving motor 43.

Each of the technical features of the above embodiments may be combined arbitrarily. To simplify the description, not all of the possible combinations of each of the technical features in the above embodiments are described. However, all of the combinations of these technical features should be considered as within the scope of this disclosure as long as they do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

The invention claimed is:

1. A drawer-type microwave oven, comprising:

a cooker body and a door, the cooker body comprising a housing and a cooking cavity provided within the housing, and both of the housing and the cooking cavity being provided with an opening corresponding to the door that is openable to cover the opening, the housing comprising a first side cover plate and a second side cover plate that are arranged oppositely, and a cavity wall of the cooking cavity arranged oppositely to the first side cover plate being provided with an air outlet mesh;

a front plate arranged around a circumference of the opening of the cooking cavity, a bottom of the front plate being provided with a front side air outlet hole penetrating the front plate, a first spacing region being formed between the first side cover plate and the cavity wall of the cooking cavity, the front side air outlet hole being in communication with the first spacing region, and the door being attached to the front plate to seal the opening when the door is closed;

a first slide rail, a second slide rail and a driving motor, the first slide rail being arranged between the cooking cavity and the first side cover plate, the second slide rail being arranged between the cooking cavity and the second side cover plate, and the driving motor being arranged in a second spacing region between the second side cover plate and the cavity wall of the cooking cavity and being configured to drive the second slide rail to move; and a flow directing assembly, an air inlet end of the flow directing assembly being in communication with the air outlet mesh, and an air outlet end of the flow directing assembly being arranged at a bottom of the first spacing region.

2. The drawer-type microwave oven according to claim 1, wherein the housing further comprises a rear cover plate connected to the first side cover plate and the second side cover plate, respectively, and a third spacing region is formed between the rear cover plate and a rear wall of the cooking cavity; the flow directing assembly comprises a first air guide cover, a side spacing plate, and a second air guide cover; the first air guide cover covers the air outlet mesh, the side spacing plate is arranged at a junction of the first spacing region and the third spacing region, and the first spacing region is isolated from the third spacing region by the side spacing plate that is provided with two air guide openings, the second air guide cover covers the two air guide openings of the side spacing plate, and the first air guide cover is in communication with the second air guide cover through one of the air guide openings, and the other air guide opening forms the air outlet end of the flow directing assembly.

3. The drawer-type microwave oven according to claim 2, further comprising a heat dissipating fan, a variable frequency power source and a magnetron; the heat dissipating fan, the variable frequency power source and the magnetron are all provided in the third spacing region, and air from the heat dissipating fan passes through the magnetron and the variable frequency power source;

the housing further includes a bottom cover plate arranged at the bottom of the cooking cavity, and the bottom cover plate is connected to the first side cover plate, the rear cover plate, and the second side cover plate, respectively; and at least one of the bottom cover plate, the first side cover plate and the rear cover plate is provided with an air inlet mesh that is in communication with the third spacing region, and the rear wall of the cooking cavity is provided with an air intake mesh.

4. The drawer-type microwave oven according to claim 3, wherein the housing further comprises a top cover plate arranged on a top of the cooking cavity, the top cover plate is connected to the first side cover plate and the rear cover plate, respectively; a fourth spacing region is formed between a top wall of the cooking cavity and the top cover plate, and the fourth spacing region is in communication with the first spacing region and the third spacing region, respectively.

5. The drawer-type microwave oven according to claim 4, wherein a side of the top wall of the cooking cavity away from the door is provided with a lateral surrounding edge attached to the top cover, and two ends of the lateral surrounding edge are arranged at intervals with the first side cover plate and the second side cover plate, respectively.

6. The drawer-type microwave oven according to claim 5, wherein the lateral surrounding edge comprises a main body surrounding edge and an arc-shaped surrounding edge connected to one end of the main body surrounding edge, the arc-shaped surrounding edge is configured to guide the air to the first spacing region; the top wall of the cooking cavity is further provided with a guide edge, a ventilation interval is provided between the guide edge and the other end of the main body surrounding edge, and the guide edge extends toward a middle part of the cooking cavity.

7. The drawer-type microwave oven according to claim 3, wherein the second air guide cover is located on a side of the side spacing plate away from the front plate, the heat dissipating fan and the air inlet mesh are both arranged at an end of the third spacing region that is close to the flow directing assembly.

8. The drawer-type microwave oven according to claim 7, wherein the heat dissipating fan comprises a first fan for dissipating heat from the variable frequency power source and a second fan for dissipating heat from the magnetron; the air inlet mesh comprises a side air inlet mesh and a bottom air inlet mesh; one of corner parts of the first side cover plate that is close to the rear cover plate and the bottom cover plate is provided with the side air inlet mesh, and one of the corner parts of the bottom cover plate that is close to the first side cover plate and the rear cover plate is provided with the bottom air inlet mesh; a plane of an air inlet of the first fan is slantwise arranged relative to the bottom cover plate, the plane of the air inlet of the first fan faces the side air inlet mesh and the bottom air inlet mesh, and a plane of an air outlet of the first fan is arranged opposite the variable frequency power source, a plane of an air inlet of the second fan faces the bottom air inlet mesh or the side air inlet mesh, and a plane of an air outlet of the second fan is arranged opposite the magnetron.

9. The drawer-type microwave oven according to claim 8, wherein one of the corner parts of the rear cover plate that is close to the first side cover plate and the bottom cover plate is provided with a rear air inlet mesh.

10. The drawer-type microwave oven according to claim 8, wherein the first fan is arranged above the second fan, and an angle between a first central axis of the first fan and a second central axis of the second fan is A that is less than 90°.

11. The drawer-type microwave oven according to claim 10, wherein the second fan is a vortex fan, an upper surface and a lower surface of the vortex fan are both provided with air inlets, the lower surface of the vortex fan is connected to a third air guide cover, and a top plate of the third air guide cover is provided with a first vent that is in communication with the air inlet on the lower surface of the vortex fan, a motor of the vortex fan is arranged within the third air guide cover, the third air guide cover covers a part of a region of the bottom air inlet mesh, and a projection of the first fan on the bottom cover plate along a vertical direction is located at another part of the region of the bottom air inlet mesh.

12. The drawer-type microwave oven according to claim 11, wherein a ventilation gap is provided between the first fan and the second fan.

13. The drawer-type microwave oven according to claim 11, wherein a shell of the variable frequency power source is provided with a first lateral ventilation flow channel, and the air outlet of the first fan is in communication with one of ports of the first lateral ventilation flow channel, and an outer wall of the other port of the first lateral ventilation flow channel is connected to a vertical spacing plate and a lateral spacing plate that are arranged on a periphery of the magnetron, the vertical spacing plate is provided with a second vent, and the air outlet of the second fan is in communication with the second vent.

14. The drawer-type microwave oven according to claim 13, wherein a power connector of the magnetron is arranged adjacent to the lateral spacing plate, the lateral spacing plate is provided with a third vent corresponding to the power connector of the magnetron, and the third vent is located on a side of the lateral spacing plate close to the vertical spacing plate.

15. The drawer-type microwave oven according to claim 13, further comprising a fourth air guide cover, a radiator shell of the magnetron is provided with a second lateral ventilation flow channel, the fourth air guide cover covers the air intake mesh, and air inlets of the second air vent, the second lateral ventilation flow channel, and the fourth air guide cover are in communication in sequence.

16. The drawer-type microwave oven according to claim 15, wherein a heat conducting edge is provided at the air inlet of the fourth air guide cover, and the heat conducting edge is attached to the magnetron.

17. The drawer-type microwave oven according to claim 1, further comprising a first spacing plate that is connected to a bottom edge of the front plate or connected to a side edge of the bottom cover plate of the housing close to the opening, the first spacing plate is located below the door and forms a front side air outlet port with a bottom end of the door, and a bottom side of the bottom cover plate is provided with supporting legs protruding downward, and the first spacing plate and a supporting surface on which the supporting legs are placed form a front side air inlet.

18. The drawer-type microwave oven according to claim 1, further comprising a second spacing plate, a fifth spacing region is formed between the cavity wall of the cooking cavity and the bottom cover plate, the second spacing plate is arranged in the fifth spacing region, and a bottom space of the first spacing region is isolated from a bottom space of the second spacing region by the second spacing plate.

* * * * *